UNITED STATES PATENT OFFICE.

JOHN G. JARVIS, OF STAMFORD, NEW YORK.

ACETYL-CELLULOSE COMPOSITION AND METHOD OF MAKING SAME.

1,343,135. Specification of Letters Patent. Patented June 8, 1920.

No Drawing. Application filed March 13, 1919. Serial No. 282,500.

*To all whom it may concern:*

Be it known that I, JOHN G. JARVIS, a citizen of the United States, residing at Stamford, in the county of Delaware and State of New York, have invented certain new and useful Improvements in Acetyl-Cellulose Compositions and Methods of Making Same; and I do hereby declare the following to be a full, clear, and exact description of the invention, such as will enable others skilled in the art to which it appertains to make and use the same.

This invention relates to new and useful improvements in cellulose acetate compositions and method of making same, and relates to a cellulose acetate soluble in acetone or acetic ether which are both well known solvents of acetyl cellulose.

I have found by experiments that if acetyl cellulose is mixed with naphthalene and then thoroughly ground and mixed together in about the proportions (by weight) of 75 parts of acetyl cellulose to 25 parts of naphthalene, I can then add about 60 parts of acetone or acetic ether or a mixture of acetone and acetic ether in about equal proportions of the two liquids. I add to this the mixture of acetyl cellulose and naphthalene, stirring the same with paddles and at the same time adding the acetone or acetic ether, or a mixture of both with a sprinkling pot, or any other well known method of adding liquids to mixed powdered materials.

This will make a mixture, which on standing 24 to 48 hours in an air-tight box, becomes a dough-like mass. This mixture of acetyl cellulose, naphthalene, etc., is now ready to be converted into a horn-like material by being put on heated rolls and made into sheets, well known in the manufacture of pyroxylin compounds. A number of these sheets are put in a press and made by heat and pressure into a solid block and sheeted as described in Patent No. 199,908 of 1878.

In the manufacture of nitro-cellulose films made in accordance with my method I have found that the product has a reduced tendency to inflammability. By the employment of pigments of various kinds, different tints may be given to the film and made opaque or transparent, as desired, and while I have specified certain proportions of the ingredients used in making my films, it will be understood that I do not confine myself to these proportions and they may be varied without departing from the spirit of the invention.

What I claim to be new is:

A composition containing 75 parts of cellulose acetate, 25 parts of naphthalene and 60 parts of acetone.

In testimony whereof I hereunto affix my signature in presence of two witnesses.

JOHN G. JARVIS.

Witnesses:
 LILLIAN A. WOLF,
 F. J. R. CLARKE.